(12) United States Patent
Keyworth et al.

(10) Patent No.: US 7,725,027 B2
(45) Date of Patent: May 25, 2010

(54) MULTI-UNIT WAVELENGTH DISPERSIVE DEVICE

(75) Inventors: Barrie Keyworth, Sittsville (CA); Pierre D. Wall, Ottawa (CA); Paul Colbourne, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 519 days.

(21) Appl. No.: 11/696,418

(22) Filed: Apr. 4, 2007

(65) Prior Publication Data

US 2007/0242953 A1    Oct. 18, 2007

Related U.S. Application Data

(60) Provisional application No. 60/789,564, filed on Apr. 6, 2006.

(51) Int. Cl.
*H04J 14/00*    (2006.01)
(52) U.S. Cl. .............. 398/47; 398/48; 398/88
(58) Field of Classification Search ............ 398/47–48, 398/82–89, 52, 75, 96
See application file for complete search history.

(56) References Cited

U.S. PATENT DOCUMENTS

| | | | | |
|---|---|---|---|---|
| 6,097,859 | A | 8/2000 | Solgaard et al. | 385/17 |
| 6,498,872 | B2 | 12/2002 | Bouevitch et al. | 385/24 |
| 6,707,959 | B2 | 3/2004 | Ducellier et al. | 385/17 |
| 6,810,169 | B2 | 10/2004 | Bouevitch | 385/24 |
| 7,014,326 | B2 | 3/2006 | Danagher et al. | 359/615 |
| 2004/0136718 | A1* | 7/2004 | McGuire | 398/88 |
| 2004/0208579 | A1* | 10/2004 | Bendett et al. | 398/84 |
| 2004/0258351 | A1* | 12/2004 | Ducellier et al. | 385/24 |
| 2006/0067611 | A1 | 3/2006 | Frisken et al. | 385/16 |

* cited by examiner

*Primary Examiner*—Dzung D Tran
(74) *Attorney, Agent, or Firm*—Teitelbaum & MacLean; Neil Teitelbaum; Doug MacLean

(57) ABSTRACT

The multi-unit wavelength switch enables multiple independent wavelength switching of a plurality of incoming multiplexed optical beams simultaneously on the same optical platform. The different units can have similar functionality or provide disparate functionality, e.g. any one or more of switching, dynamic gain equalization, wavelength blocking, and power monitoring.

15 Claims, 11 Drawing Sheets

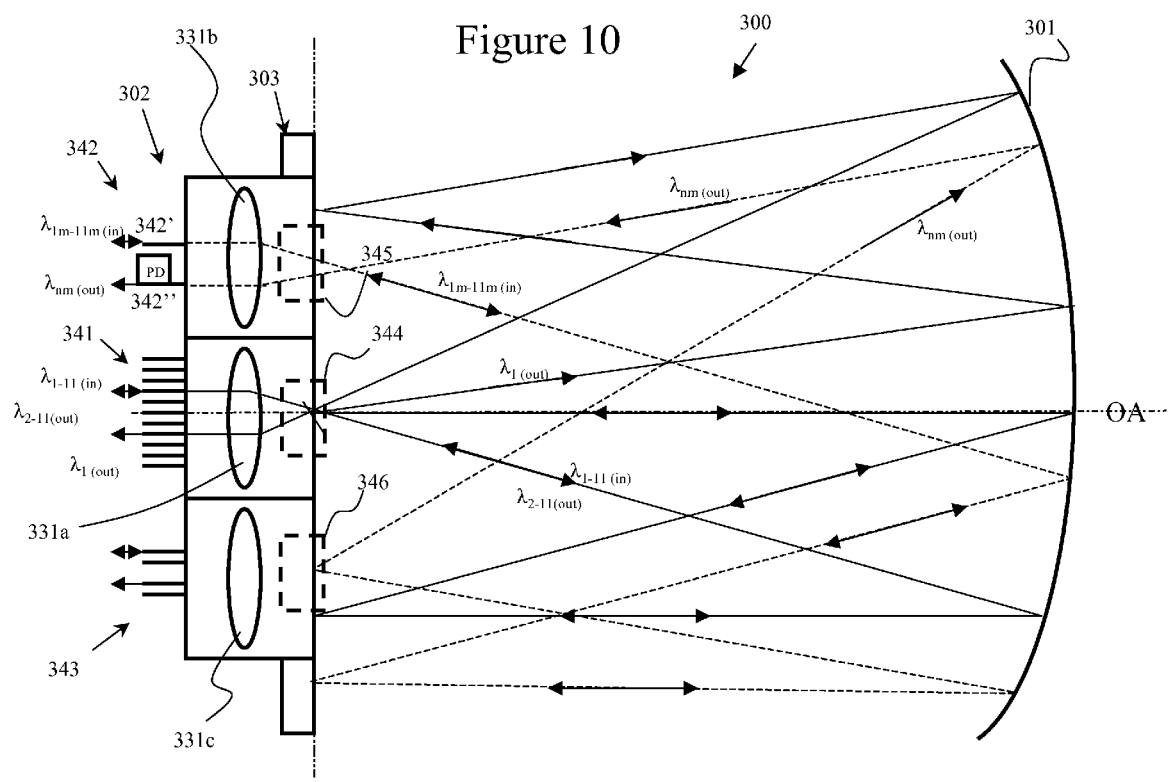

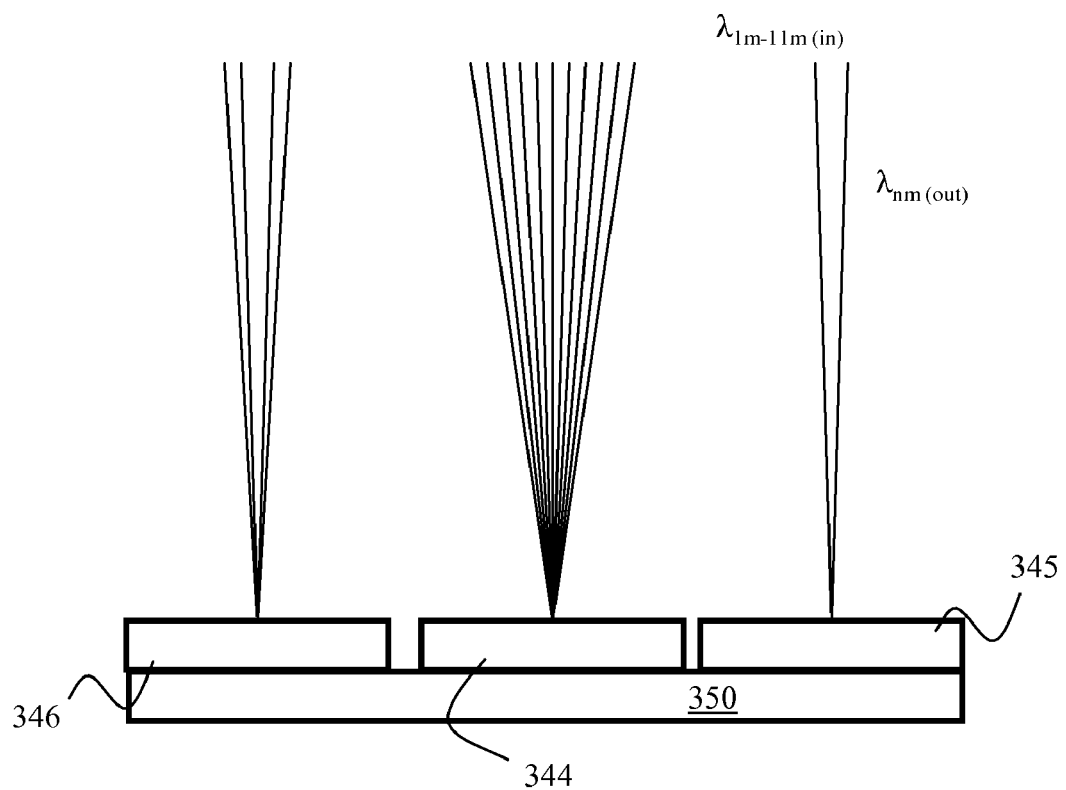

MULTI-UNIT WAVELENGTH DISPERSIVE DEVICE

CROSS-REFERENCE TO RELATED APPLICATIONS

The present invention claims priority from U.S. Patent Application No. 60/789,564 filed Apr. 6, 2006, which is incorporated herein by reference for all purposes.

TECHNICAL FIELD

The present invention relates to a multi-unit wavelength dispersive optical device, and in particular to the integration of a plurality of independent wavelength dispersive optical devices onto a single platform.

BACKGROUND OF THE INVENTION

Conventional optical wavelength dispersive devices, such as those disclosed in U.S. Pat. No. 6,097,859 issued Aug. 1, 2000 to Solgaard et al; U.S. Pat. No. 6,498,872 issued Dec. 24, 2002 to Bouevitch et al; U.S. Pat. No. 6,707,959 issued Mar. 16, 2004 to Ducellier et al; U.S. Pat. No. 6,810,169 issued Oct. 26, 2004 to Bouevitch; and U.S. Pat. No. 7,014,326 issued Mar. 21, 2006 to Danagher et al, separate a multiplexed optical beam into constituent wavelengths, and then direct individual wavelengths or groups of wavelengths, which may or may not have been modified, back through the device to a desired output port. Typically the back end of the device includes individually controllable devices, such as a micro-mirror array, which are used to redirect selected wavelengths back to one of several output ports, or an array of liquid crystal cells, which are used to block or attenuate selected wavelengths.

FIG. 1 illustrates a top view of a typical platform 102A for a wavelength dispersive device in which a light redirecting element having optical power in the form of a spherical reflector 120 receives a beam of light from a front-end unit 122. The spherical reflector 120 reflects the beam of light to a diffraction grating 124, which disperses the beam of light into its constituent wavelength channels. The wavelength channels are again redirected by the spherical mirror 120 to a backend unit 126.

In the case of a wavelength blocker (WB) or a dynamic gain equalizer (DGE) the front end unit 122 can include a single input/output port with a circulator, which separates incoming from outgoing signals, or one input port with one output port. Typically the front end unit 122 will include a polarization diversity unit for ensuring the beam (or sub-beams) of light has a single state of polarization. The backend unit 126 for a WB or a DGE is an array of liquid crystal cells, which independently rotate the state of polarization of the wavelength channels to either partially attenuate or completely block selected channels from passing back through the polarization diversity unit in the front end 122.

In the case of a wavelength selective switch (WSS) the front end unit 122 includes (See FIG. 2) an array 132 of input/output fibers 132A to 132D, each of which may have a corresponding lens 134A to 134D, respectively, forming a lens array 134. An angle to offset (or switching) lens 136 converts the lateral offset of the input fibers 132A to 132D into an angular offset at a point 138, which is imaged by the spherical lens 120 onto the backend unit 126. The lens array 134 can be removed depending on the relative positions of the switching lens 136. The backend unit 126 in an WSS is typically a micro-electro-mechanical (MEMS) array of tilting mirrors which can be used to steer each of the demultiplexed beams to one of several positions corresponding to a desired output port. The angle introduced at the back end unit 126 is then transformed by the angle to offset lens 136 to a lateral offset corresponding to the desired input/output fiber 132A to 132D. Alternatively, a liquid crystal phased array (LC or LCoS, if incorporated on a silicon driver substrate) can be used to redirect the light.

In operation as an WSS, a multiplexed beam of light is launched into the front-end unit 122 and optionally passes through a polarization beam splitter 138 and a waveplate 140A or 140B (See FIG. 3) to provide two sub-beams of light having the same state of polarization. The two sub-beams of light are transmitted to the spherical reflector 120 and are reflected therefrom towards the diffraction grating 124. The diffraction grating 124 separates each of the two sub-beams into a plurality of channel sub-beams of light having different central wavelengths. The plurality of channel sub-beams are transmitted to the spherical reflector 120, which redirects them to the MEMS or LC phased array 126, where they are incident thereon as spatially separated spots corresponding to individual spectral channels.

Each channel sub-beam can be reflected backwards along the same path or a different path, which extends into or out of the page in FIG. 1 to the array of fibers 132, which would extend into the page. Alternatively, each channel sub-beam can be reflected backwards along the same path or a different path, which extends in the plane of the page of FIG. 1. The sub-beams of light are transmitted, from the MEMS or LC phased array 126, back to the spherical reflector 120 and are redirected to the diffraction grating 124, where they are recombined and transmitted back to the spherical reflector 120 to be transmitted to a predetermined input/output port shown in FIG. 2.

FIG. 4 illustrates a conventional in-plane or horizontally switching platform, in which an input beam with optical wavelength channels $\lambda_1$ and $\lambda_2$ is launched via input/output port 31 through switching lens 35 to concave mirror 40. The input beam is redirected and collimated onto a diffraction grating 50, which laterally disperses the optical wavelength channels, and directs them at the concave mirror 40. Each optical wavelength channel is directed at and focused onto a different independently controllable micro-mirror, e.g. 61 and 62, which make up a MEMs array 60. The first optical wavelength channel $\lambda_1$ is reflected straight back and therefore exits the input/output port 31, while the second optical wavelength channel $\lambda_2$ is reflected at a predetermined angle corresponding to the lateral position of a second input/output port 32.

A transmission path correction element, i.e. wedge, 100, with front and rear non-parallel faces 101 and 102, respectively, is installed between the concave mirror 40 and the MEMS array 60. The purpose of this correction element 100 is to modify the paths of the optical signals focused by the concave mirror 40, so as to effectively rotate the best fit planar surface approximation FP into coplanar coincidence with the optical signal-receiving surface MP 65 of the MEMS array 60. Non-limiting examples of a suitable (field-flattening) transmission path correction element that may be used for this purpose include a portion or segment of a cylindrical lens and an optical transmission wedge. With the curvilinear focal surface LP of the spherical mirror 40 being transformed into a focal plane FP, and with that plane FP being coincident with the MEMS array plane MP 65, variation in loss, as minimized by the best fit linear approximation of the focal plane, will be effectively eliminated.

Unfortunately, each time a customer wishes to purchase a WB, a DGE, an MWS or any form of monitor therefor, they must purchase a separate dispersion platform, i.e. spherical lens and diffraction grating along with associated opto-mechanics and packaging. An object of the present invention is to overcome the shortcomings of the prior art by providing a multi-unit wavelength dispersive device, in which a plurality of independent front and backend units can utilize the same dispersion platform and share the same opto-mechanics and packaging.

SUMMARY OF THE INVENTION

Accordingly, the present invention relates to a multi-unit wavelength dispersing device comprising:

a first input port for launching a first multiplexed optical input beam including a plurality of wavelength channels;

one or more first output ports for outputting one or more of the plurality of wavelength channels from the first optical input beam;

a first switching lens having a first optical axis for converting a lateral displacement corresponding to a position of the first input port relative to the first optical axis into an angular displacement relative to the first optical axis, and for converting an angular displacement of an outgoing optical beam into a lateral displacement corresponding to a position of a selected one of the one or more first output ports;

a second input port for launching a second multiplexed optical input beam including a plurality of wavelength channels;

one or more second output ports for outputting one or more of the plurality of wavelength channels from the second optical input beam;

a second switching lens having a second optical axis for converting a lateral displacement corresponding to a position of the second input port relative to the second optical axis into an angular displacement relative to the second optical axis, and for converting an angular displacement of an outgoing optical beam into a lateral displacement corresponding to a position of a selected one of the one or more second output ports;

a main lensing element with optical power, having a central axis, for directing and focusing the first and second input optical beams;

a wavelength dispersing element for dispersing the first and second multiplexed optical input beams into constituent wavelength channels;

a first array of wavelength channel redirecting elements for independently directing one or more selected wavelength channels from the plurality of wavelength channels in the first optical input beam to a selected one of the one or more first output ports via the main lensing element and the wavelength dispersing element by providing an angular displacement to the one or more selected wavelength channels for conversion by the first switching lens into a lateral position corresponding to the selected first output port; and a second array of wavelength channel redirecting elements for independently directing one or more selected wavelength channels from the plurality of wavelength channels in the second optical input beam to a selected one of the one or more second output ports via the main lensing element and the wavelength dispersing element by providing an angular displacement to the one or more selected wavelength channels for conversion by the second switching lens into a lateral position corresponding to the selected second output port.

BRIEF DESCRIPTION OF THE DRAWINGS

The invention will be described in greater detail with reference to the accompanying drawings which represent preferred embodiments thereof, wherein:

FIG. 10 is a schematic representation of a side view of a wavelength dispersive device according to an embodiment of the present invention; and FIG. 11 is a schematic representation of a side view of a back-end unit of a wavelength dispersive device according to the device of FIG. 10.

DETAILED DESCRIPTION

Figure 5:
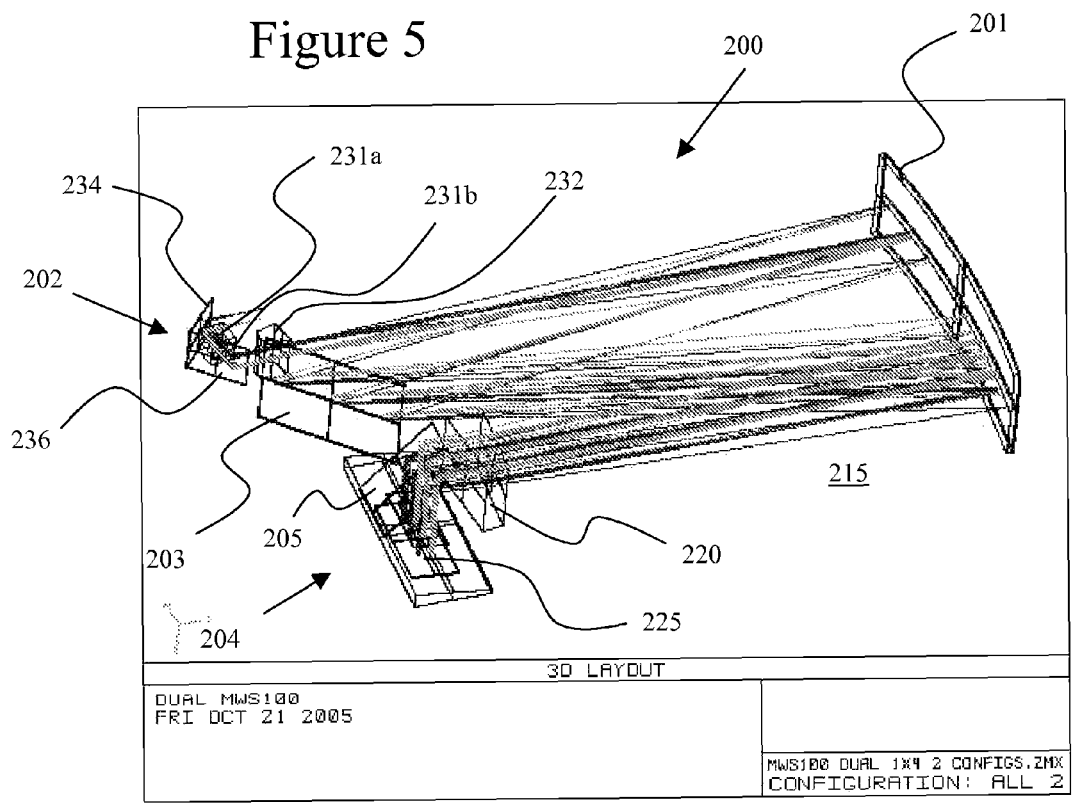
FIG. 5 is a schematic representation of an isometric view of a wavelength dispersive device according to the present invention.
Figure 6:
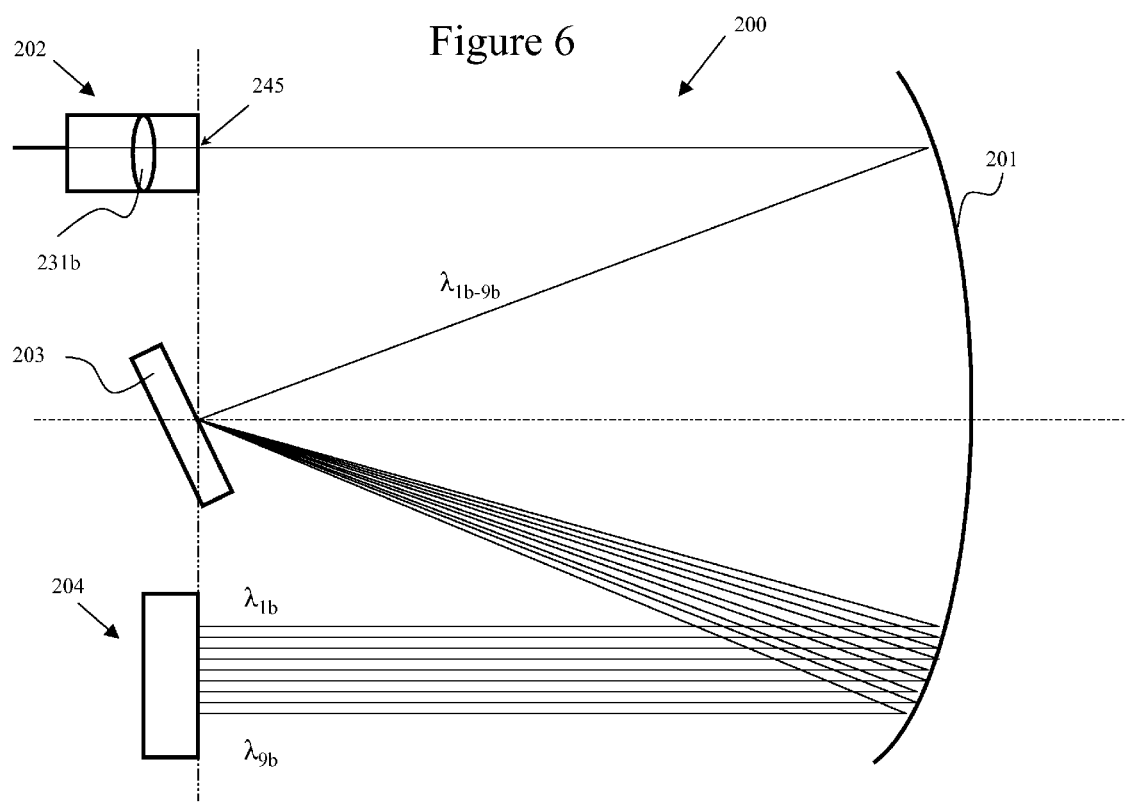
FIG. 6 is a schematic representation of a top view of a wavelength dispersive device according to the present invention

A dual wavelength dispersive device 200, illustrated in FIG. 5, includes a single main lensing element having optical power, preferably in the form of a spherical, e.g. concave, reflector 201, which receives two independent collimated beams of light from the front-end unit 202, and which receives and reflects beams of light to and from a wavelength dispersing element, e.g. a diffraction grating 203, and to and from a backend unit 204. In this embodiment the front-end unit 202, the diffraction grating 203, and the backend unit 204 are each disposed along a single focal plane of the spherical reflector 201; however, other arrangements are within the scope of the invention, including using a convex lens (or a series of lenses) and placing the diffraction grating 203 on the opposite side thereof as the front and backend units 202 and 204, respectively.

Preferably, the diffraction grating 203, the spherical reflector 201, and the backend unit 204 are each constructed of fused silica and mounted together with a beam folding mirror or prism 205 to a supporting plate 215 made of the same or made from a suitable low-expansion material, such as Invar®. The beam folding mirror or prism 205 is provided for space considerations, e.g. a MEMS chip with MEMS mirrors defining the backend unit 204 and their carrier are too large to fit next to the diffraction grating 203. Accordingly, the beam folding mirror 205 redirects the beams so that the MEMS mirrors can be placed flat under the rest of the optics. Advantageously, the design of FIG. 5 provides stability with respect to small temperature fluctuations. Moreover, the design of FIG. 5 is defocus free, since the radius of curvature of the spherical reflector 201 changes in proportion to thermal expansion or contraction of any other linear dimensions. Advantageously, the spherical mirror 201 has substantially no chromatic aberrations. The wavelength dispersing element 203 can be a reflective or a transmissive diffraction grating, with ruled or replicated lines or holographically generated lines Preferably, a transmission path correction element 220 is installed between the redirecting element, e.g. the concave mirror 201, and the backend unit 204, e.g. a MEMS array 243, for reasons discussed hereinbefore with reference to FIG. 4.

In the front-end unit 202, the single switching lens, e.g. 136 or 35, found in conventional wavelength dispersive devices, is replaced by first and second horizontal cylindrical lenses 231a and 231b and a single vertical cylindrical lens 232 to create an elliptical beam through the system, for reduced height of the optical system. The first and second horizontal cylindrical lenses 231a and 231b, are positioned between two fold mirrors 234 and 236, and act as the switching lens, while creating the desired beam waist size in the vertical direction; the single vertical cylinder lens 232 creates the desired beam waist size in the horizontal direction, i.e. there are separate switching lenses 231a and 231b (horizontal cylinder lenses) for each beam at the front end unit 202, while the "conditioning" lens 232 (vertical cylinder lens) is common to all the beams.

For the sake of simplicity, the fold mirrors 205, 234 and 236, and conditioning lens 232 will be eliminated from any further illustrations.

Figure 1:
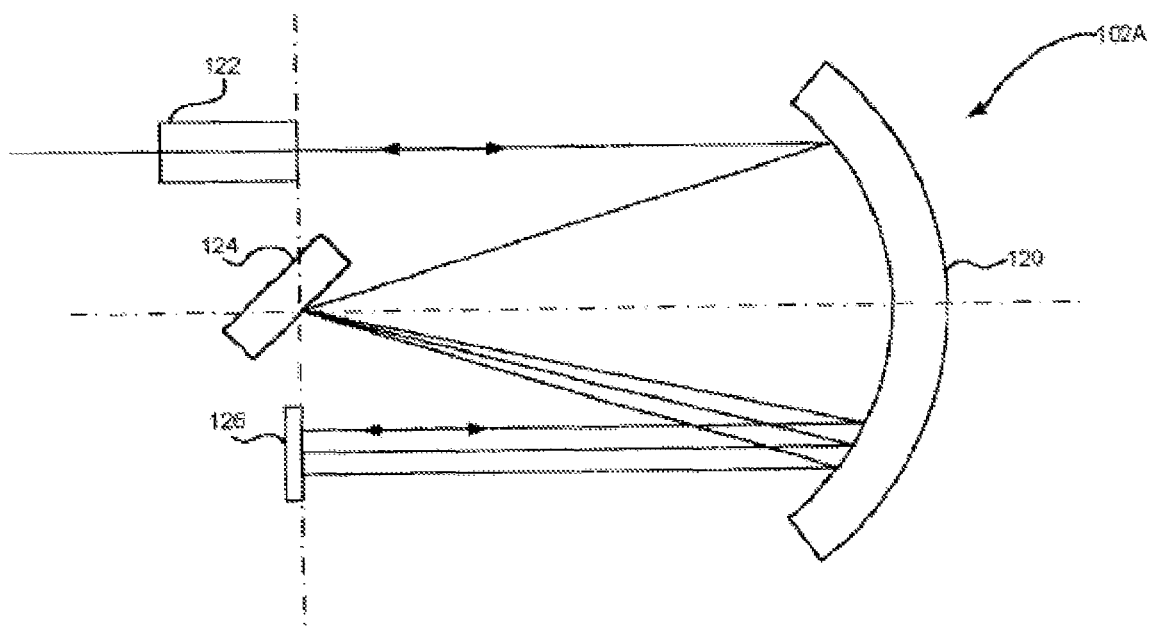
FIG. 1 is a schematic representation of a top view of a conventional wavelength dispersive device.
Figure 2:
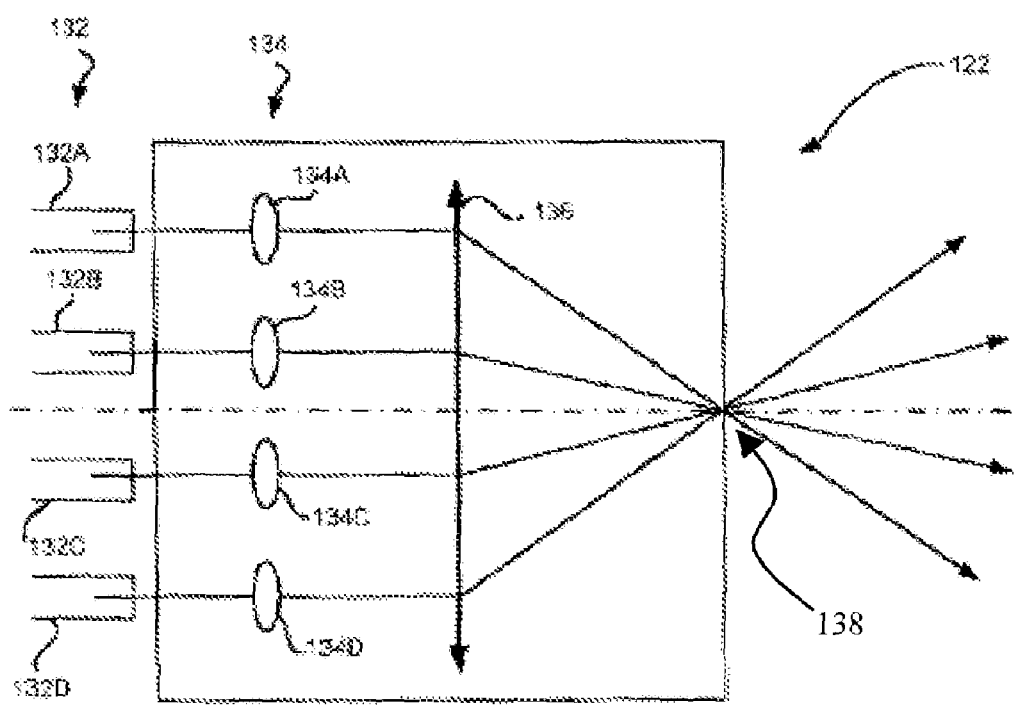
FIG. 2 is a schematic representation of a front end of the device of FIG. 1.
Figure 3:
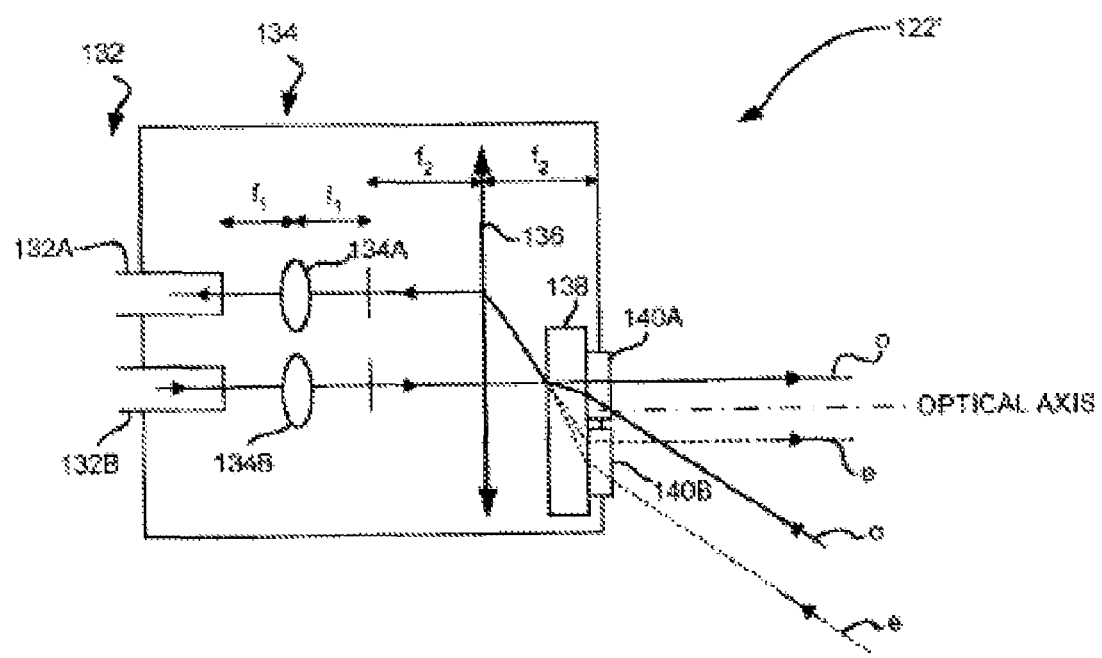
FIG. 3 is a schematic representation of a front end of the device of FIG. 1.

With reference to FIGS. 6 to 9, the operation of the dual wavelength dispersion device 200 will be described with reference to simultaneously redirecting a pair of wavelength channels $\lambda_{1a}$ and $\lambda_{2a}$ from a first input optical beam including a plurality of wavelength channels $\lambda_{1a}$ to $\lambda_{9a}$, and independently redirecting a pair wavelength channel $\lambda_{8b}$ and $\lambda_{9b}$ from a second input optical beam including a plurality of wavelength channels $\lambda_{1b}$ to $\lambda_{9b}$. Since the number of supported wavelengths usually exceeds the number of output ports, each wavelength channel $\lambda_{1a}$ and $\lambda_{2a}$ can represent one or several wavelength channels. The front end unit 202 includes a first set of input/output ports 241 optically coupled to the first horizontal cylindrical lens 231a, and a second set of input/output ports 242 optically coupled to the second horizontal cylindrical lens 231b, but not optically coupled to the first horizontal cylindrical lens 231a. Preferably, the first set of input/output ports 241 are positioned symmetrically on either side of the optical axis of the first horizontal cylindrical lens 231a, while the second set of input/output ports 242 are positioned symmetrically on either side of the optical axis of the second horizontal cylindrical lens 231b The second set of input/output ports 242 are independent of the first set of input/output ports 241, i.e. light entering one of the first set of input/output ports 241 will not exit one of the second set of input/output ports 242. Preferably, the first and second horizontal cylindrical lenses 231a and 231b are substantially equally spaced on opposite sides of the optical axis OA of the reflector 201. Typically a multiplexed beam of light is launched into the front-end unit 202 and passes through a polarization beam splitter and a waveplate (See FIG. 3) to provide two sub-beams of light having the same state of polarization; however, for the sake of simplicity only a single input optical beam will be discussed hereinafter.

Figure 7:
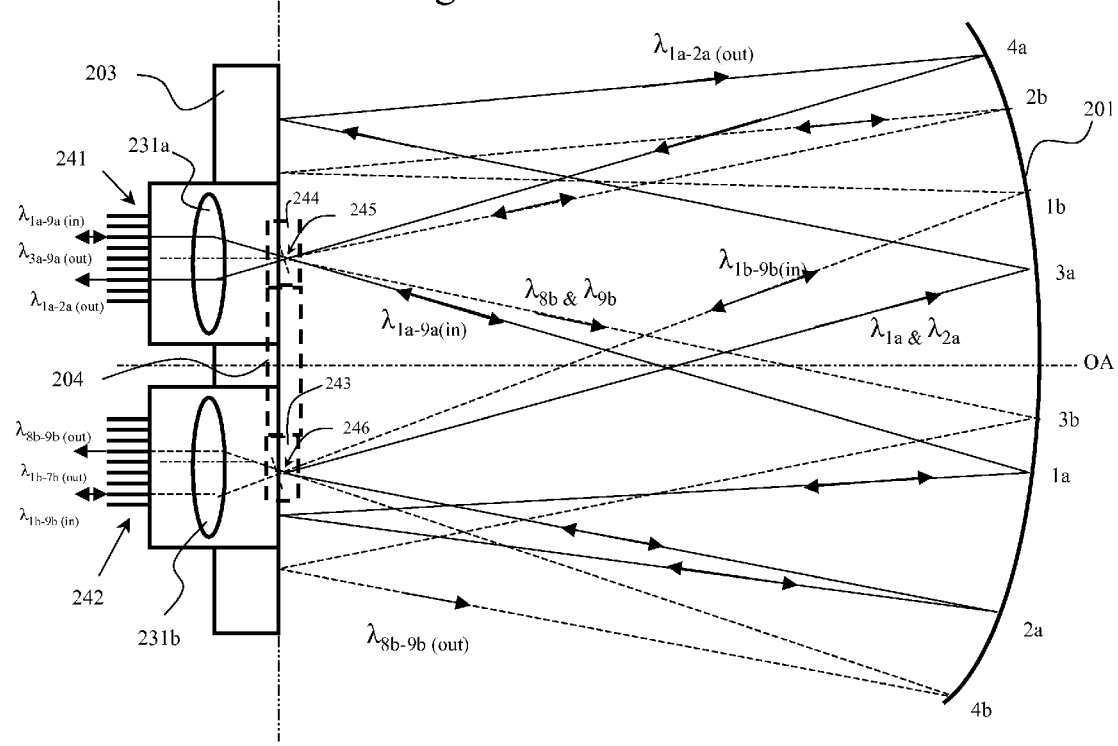
FIG. 7 is a schematic representation of a side view of a wavelength dispersive device according to an embodiment of the present invention.

The first input optical beam including the plurality of wavelength channels $\lambda_{1a}$ to $\lambda_{9a}$ is launched via one of the input/output ports in the first set of input/output ports 241 and is redirected by the first horizontal cylindrical lens 231a through a point 245 in the focal plane of the reflector 201 to become incident on the reflector 201 for a first time at point 1a. The first input optical beam is reflected and collimated by the reflector 201 towards the diffraction grating 203, whereby the first input optical beam is angularly dispersed into constituent wavelength channels, as each wavelength is reflected off of the diffraction grating 203 at a different angle (see FIG. 6). In the preferred embodiment illustrated in FIGS. 6 and 7, the wavelengths are dispersed in a dispersion plane, which is in the plane of (or parallel to or at an acute angle to the plane of) FIG. 6, but perpendicular to the plane of FIG. 7, and perpendicular to the plane including the first and second sets of input/output ports 241 and 242, respectively, although dispersing the wavelengths in the plane of FIG. 7 is also possible.

Figure 8:
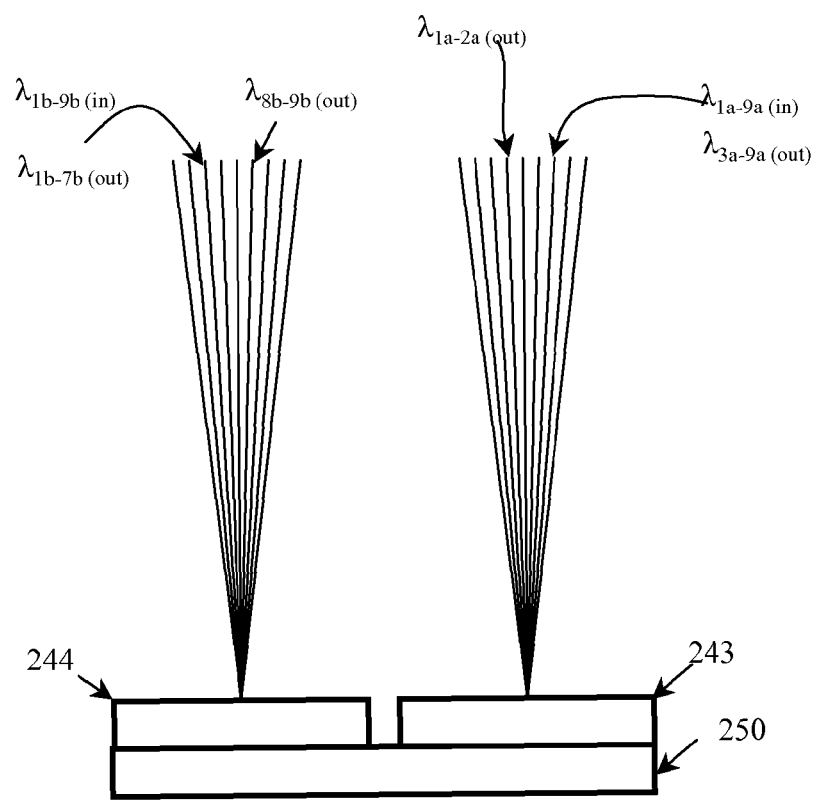
FIG. 8 is a schematic representation of a side view of a back-end unit of a wavelength dispersive device according to the device of FIG. 7.
Figure 9:
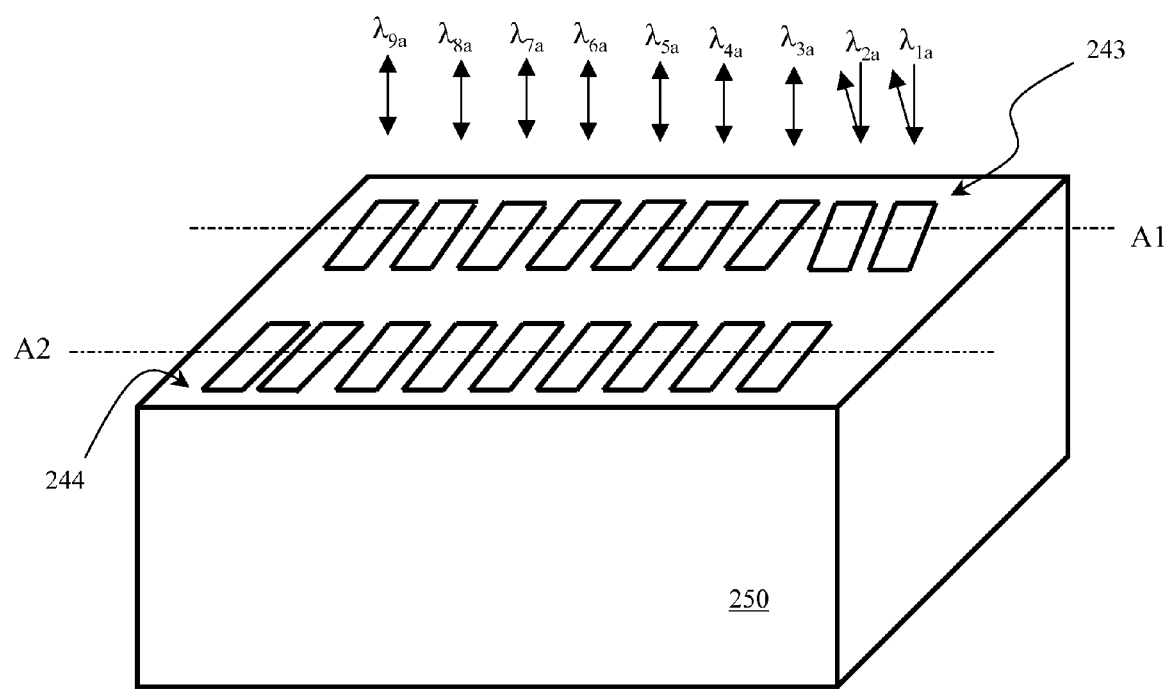
FIG. 9 is a schematic representation of an isometric view of a back-end unit of a wavelength dispersive device according to the device of FIG. 7.

The dispersed wavelengths $\lambda_{1a}$ to $\lambda_{9a}$ are incident on the reflector 201 a second time at a series of points 2a, and are then reflected and focused to a first array of channel wavelength redirecting elements 243 e.g. a MEMs array of mirrors or an LC phased array, in the backend 204 in a first dispersion plane. The first array of redirecting elements 243 includes a plurality of tilting mirrors or LC cells, one for each wavelength channel for independently redirecting each wavelength channel $\lambda_{1a}$ to $\lambda_{9a}$ to any one of the first set of input/output ports 241. Preferably, all of the mirrors in the MEMs array 243 tilt about a single axis A1, which lies in the first dispersion plane (or parallel thereto), i.e. in or parallel to or at an acute angle to the plane of FIG. 6 and perpendicular to the plane of FIG. 7, to enable the wavelength channels $\lambda_{1a}$ to $\lambda_{9a}$ to be redirected out at an acute angle to the first dispersion plane, i.e. out of the plane of FIG. 6 and in the plane of (or a plane parallel to the plane of) FIG. 7. In the illustrated alignment, one or more of the wavelength channels, e.g. $\lambda_{1a}$ and $\lambda_{2a}$, is redirected by the first MEMs array 243 relative to the remaining wavelength channels $\lambda_{3a}$ to $\lambda_{9a}$, which travel back along the same path as the incoming signal hitting the reflector 201 at points 2a, recombining at the diffraction grating 203 forming a first multiplexed output beam, hitting the reflector 202 at point 1a, and exiting the same input/output port through which the input beam was launched. FIG. 8 illustrates the nine angles of reflection, i.e. nine angular positions, provided by the MEMs array 243 corresponding to the nine input ports in the first set of input/output ports 241. More or less reflection angles, i.e. angular positions, are possible depending on the number of input/output ports. The redirected wavelength channels $\lambda_{1a}$ and $\lambda_{2a}$ are directed towards and reflector 201 and are incident thereon for a third time at point 3a, after which the wavelength channels $\lambda_{1a}$ and $\lambda_{2a}$ are directed to the diffraction grating 203 at a separate location than before for recombination into a second multiplexed output beam. Subsequently, the second multiplexed output beam, comprised of the wavelength channels $\lambda_{1a}$ and $\lambda_{2a}$, is reflected by the reflector 201 to the front end 202. The second multiplexed output beam, along with all incoming and outgoing beams, passes through point 245 in the focal plane of the reflector 201 at an angle to the optical axis of the first horizontal cylindrical lens 231a, corresponding to the reflection angle provided by the MEMs array 243, which corresponds to the desired input/output port. The first horizontal cylindrical lens 231a converts the angle into a lateral displacement corresponding to the lateral position of the desired input/output port in the set of input/output ports 241.

Simultaneously, a second input optical beam including a plurality of wavelength channels $\lambda_{1b}$ to $\lambda_{9b}$ is launched via one of the input/output ports in the second set of input/output ports 242 and redirected by the second horizontal cylindrical lens 231b through a point 246 in the focal plane of the reflector 201 to become incident on the reflector 201 for a first time at point 1b. The second input optical beam is reflected by the reflector 201 towards the diffraction grating 203, whereby the second input optical beam is angularly dispersed into constituent wavelength channels, as each wavelength is reflected off of the diffraction grating 203 at a different angle (see FIG. 6). In the preferred embodiment illustrated in FIGS. 6 and 7, the wavelengths are dispersed in a dispersion plane, which is in the plane of (or parallel to or at an acute to angle the plane of) FIG. 6, but perpendicular to the plane of FIG. 7, and perpendicular to the plane including the first and second sets of input/output ports 241 and 242, respectively, although dispersing the wavelengths in the plane of FIG. 7 (or a plane parallel to the plane of FIG. 7) is also possible.

The dispersed wavelengths $\lambda_{1b}$ to $\lambda_{9b}$ are incident on the reflector 201a second time at a series of points 2b, and are then reflected to a second array of channel wavelength redirecting elements e.g. a MEMs array 244, in the backend 204 in a second dispersion plane preferably parallel to the first dispersion plane. The MEMs array 244 includes a plurality of tilting mirrors, one for each wavelength channel for independently redirecting each wavelength channel $\lambda_{1b}$ to $\lambda_{9b}$ to any one of the second set of input/output ports 242, i.e. only the second set of input/output ports 242, none of the first set of input/output ports 241. Preferably, the mirrors in the second MEMs array 244 tilt about an axis A2, which lies in the second dispersion plane, i.e. in or parallel to the plane of FIG. 6 and perpendicular to the plane of FIG. 7, to enable the wavelength channels $\lambda_{1b}$ to $\lambda_{9b}$ to be redirected out at an acute angle to the second dispersion plane, i.e. out of the plane of (or a plane parallel to the plane) FIG. 6 and in the plane of (or a plane parallel to the plane of) FIG. 7. In the illustrated alignment, one or more of the wavelength channels, e.g. $\lambda_{1b}$ and $\lambda_{2b}$, are redirected by the second MEMs array 244 relative to the remaining wavelength channels $\lambda_{3b}$ to $\lambda_{9b}$, which travel back along the same path as the second input beam hitting the reflector 201 at points 2b, recombining at the diffraction grating 203 forming a third multiplexed output beam, hitting the reflector 202 at point 1b, and exiting the same input/output port through which the second input beam was launched. FIG. 8 illustrates the nine angles of reflection, i.e. nine angular positions, provided by the MEMs array 244 corresponding to the nine input ports in the second set of input/output ports 242. More or less reflection angles, i.e. angular positions, are possible depending on the number of input/output ports. The redirected wavelength channels $\lambda_{1b}$ and $\lambda_{2b}$ are directed towards and reflector 201 and is incident thereon for a third time at point 3b, after which the wavelength channels $\lambda_{1b}$ and $\lambda_{2b}$ are directed to the diffraction grating 203 at a separate location than before for recombination into a fourth multiplexed output beam. Subsequently, the fourth multiplexed output beam, comprised of the wavelength channels $\lambda_{1b}$ and $\lambda_{2b}$, is reflected by the reflector 201 to the front end 202. The fourth multiplexed output beam, along with all incoming and outgoing beams, passes through point 246 in the focal plane of the reflector 201 at an angle to the optical axis of the second horizontal cylindrical lens 231b, corresponding to the reflection angle provided by the second MEMs array 244, which corresponds to the desired input/output port. The second horizontal cylindrical lens 231b converts the angle into a lateral displacement corresponding to the lateral position of the desired input/output port in the second set of input/output ports 242.

In the illustrated example, the first and second MEMs arrays 243 and 244 are separated by the same amount as the first and second horizontal cylindrical lenses are separated, e.g. by about 1.5 mm, and the first and second sets of input/output ports are separated by approximately 1.5 mm. The first and second MEMs arrays 243 and 244 are preferably fabricated parallel to each other on a single substrate 250, which would enable precision alignment between the two arrays, thus eliminating the need for separate alignment of the two arrays 243 and 244. A dual row MEMs array is less expensive than two single row MEMs arrays, and only marginally more expensive than a single row MEMs array. Similarly, the first and second horizontal cylindrical lenses 231a and 231b can be fabricated as a single molded optical element, thereby enabling precision alignment therebetween, and eliminating separate alignment of the individual lenses.

Alternative arrangements could have any combination of wavelengths $\lambda_{1a}$ to $\lambda_{9a}$ being output any combination of input/output ports in the first set of input/output ports 241, and any combination of wavelengths $\lambda_{1b}$ to $\lambda_{9b}$ being output any combination of input/output ports in the second set of input/output ports 242. Moreover, the first and second MEMs arrays 243 and 244 can be designed to switch the individual wavelength channels within the same dispersion plane, while the first and second set of input ports 241 and 242 can also be aligned in the same dispersion plane.

Furthermore, the first and second MEMs array 243 and 244 can be replaced by other optical switching elements, e.g. liquid crystal on silicon (LCoS) phased arrays, such as those disclosed in United States Patent Publication No. 2006/0067611 published Mar. 30, 2006 to Frisken et al, or an array of polarization rotators, e.g. liquid crystal cells, for independently rotating the polarization of individual wavelength channels $\lambda_{1b}$ to $\lambda_{9b}$, whereby a portion, i.e. for a DGE, or the entire wavelength channel, i.e. for a WB or WSS, will be blocked or switched by a beam splitting element provided in the backend unit 204 or in the front end unit 202, e.g. as part of the polarization diversity element. For a DGE or a WB arrangement, all of the wavelength channels $\lambda_{1b}$ to $\lambda_{9b}$ are recombined by the grating 203 into a single multiplexed output beam, and are returned to the same input/output port, whereby a circulator directs the single multiplexed output beam to an output port. Alternatively, all of the wavelength channels $\lambda_{1b}$ to $\lambda_{9b}$ can be redirected by the polarization rotating device at an angle to the incoming beam and recombined by the grating 203 into a single multiplexed output beam, which is output a different input/output port in the front end unit 202.

With reference to FIGS. 10 and 11, a multi-unit WSS device 300 preferably includes a single main lensing element having optical power in the form of a spherical, i.e. concave, reflector 301, which receives three independent collimated beams of light from the front-end unit 302, and which receives and reflects beams of light to and from a diffraction grating 303, and to and from a backend unit 304. In this embodiment the front-end unit 302, the diffraction grating 303, and the backend unit 304 are each disposed along a single focal plane of the spherical reflector 301; however, other arrangements are within the scope of the invention, including using a convex lens and placing the diffraction grating 303 on the opposite side thereof as the front and backend units 302 and 304, respectively.

Figure 4:
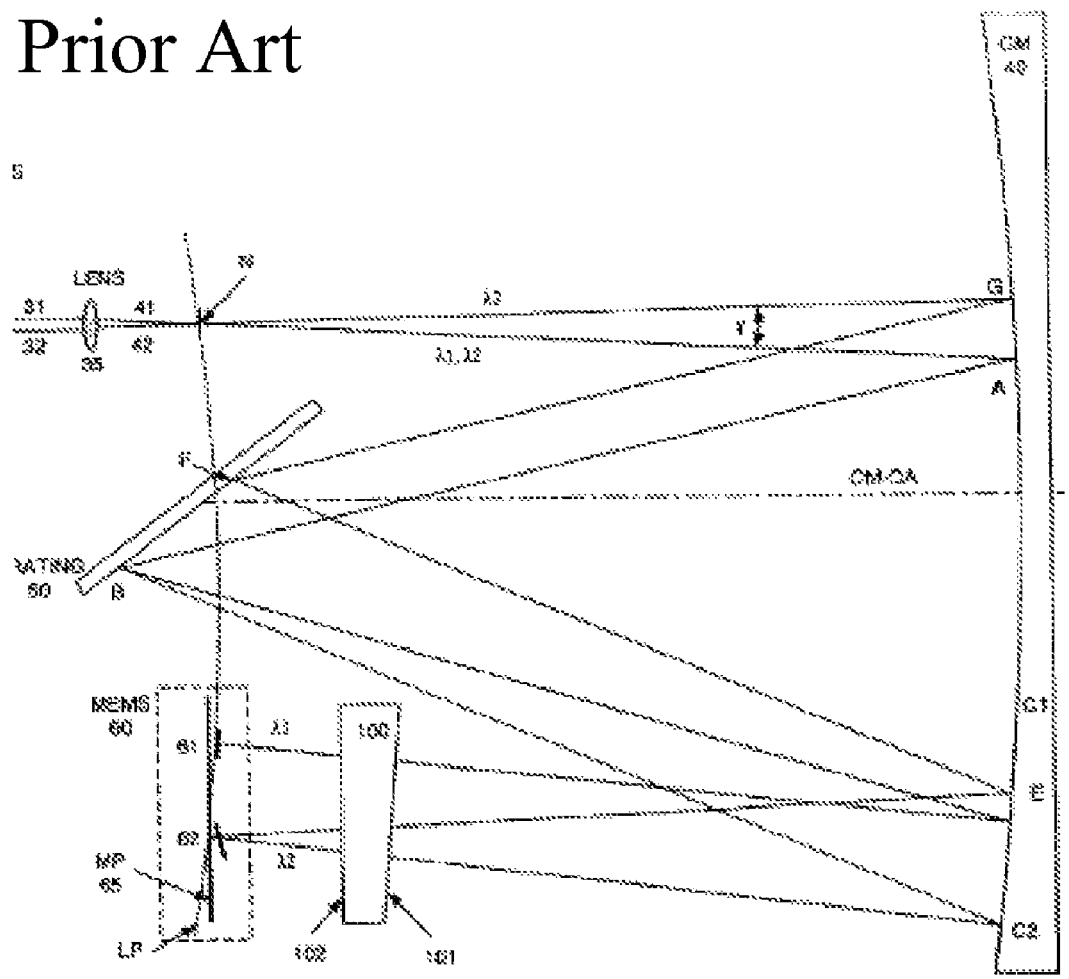
FIG. 4 is a schematic representation of a top view of another conventional wavelength dispersive switch.

A transmission path correction element can be installed between the redirecting element, e.g. the concave mirror 301, and the backend unit 304, e.g. a MEMS array 343, for reasons discussed hereinbefore with reference to FIG. 4.

In the front-end unit 302, the single switching lens, e.g. 136 or 35, found in conventional wavelength dispersive devices, is replaced by first, second and third horizontal cylindrical lenses 331a, 331b and 331c and a single vertical cylindrical lens 332 to create an elliptical beam through the system, for reduced height of the optical system. The first, second and third horizontal cylindrical lenses 331a, 331b and 331c, can be positioned between two fold mirrors (not shown), and act as the switching lens, while creating the desired beam waist size in the vertical direction; the single vertical cylinder lens 332 creates the desired beam waist size in the horizontal direction, i.e. there are separate switching lenses 331a, 331b and 331c (horizontal cylinder lenses) for each beam at the front end unit 302, while the "conditioning" lens 332 (vertical cylinder lens) is common to all the beams. For the sake of simplicity, the fold mirrors and conditioning lens have been eliminated from the illustrations.

The front end unit 302 includes a first set of input/output ports 341 optically coupled to the first horizontal cylindrical lens 331a, and a second set of input/output ports 342 optically coupled to the second horizontal cylindrical lens 331b, but not optically coupled to the first horizontal cylindrical lens 331a, and a third set of input/output ports 343 optically coupled to the third horizontal lens 331c, but not the first and second horizontal cylindrical lenses 331a and 331b. Preferably, the first set of input/output ports 341 are positioned symmetrically on either side of the optical axis of the first horizontal cylindrical lens 331a, while the second set of input/output ports 342 are positioned symmetrically on either side of the optical axis of the second horizontal cylindrical lens 331b, and the third set of input/output ports 343 are positioned symmetrically on either side of the optical axis of the second horizontal cylindrical lens 331c. The second and third sets of input/output ports 342 and 343 are independent of each other and of the first set of input/output ports 341, i.e. light entering one of the first set of input/output ports 341 will not exit one of the second set of input/output ports 342. Preferably, the optical axis of the first horizontal cylindrical lens 331a is aligned with the central axis of the reflector 301, while the second and third horizontal cylindrical lenses 331b and 331c are substantially equally spaced on opposite sides of the optical axis OA of the reflector 301. Typically a multiplexed beam of light is launched into the front-end unit 302 and passes through a polarization beam splitter and a waveplate (See FIG. 3) to provide two sub-beams of light having the same state of polarization; however, for the sake of simplicity only a single input optical beam will be discussed hereinafter.

A first array of MEMs mirrors 344 in the back end unit 304 is used to independently direct one or more selected wavelength channels, e.g. $\lambda_{1c}$, from the original set of wavelength channels, e.g. $\lambda_{1c}$ to $\lambda_{11c}$, to selected output ports in the first array of output ports 341, as hereinbefore described with reference to FIG. 7.

When switching lenses are placed above and/or below the optical axis OA of the spherical reflector 301, the available numerical aperture on the spherical reflector 301 is reduced, whereby fewer ports can be accommodated. In the multi-unit MWS 300 the first horizontal cylindrical lens 331a is positioned on-axis with the reflector 301, whereby eleven ports can be accommodated in the first set of input/output ports 341; however, the farther the second and third cylindrical lenses 331b and 331c are from the optical axis OA of the spherical reflector 301, the fewer the number of ports that can be accommodated in the second and third sets of input/output ports 342 and 343. Accordingly, the second and third sets of input/output ports 342 and 343 can be used for alternative functions, e.g. DGE, WB or reduced port-count WSS (as hereinbefore described) and channel monitoring. In the case in which the second or third set of ports is used for a reduced port count WSS capable of functioning in an Nx1 configuration with N input ports for accepting multiplexed inputs and one common output, external passive combiners can be added to the N input ports to further increase the total input port count.

For channel monitoring, a plurality of wavelength channels, e.g. $\lambda_{1m}$ to $\lambda_{11m}$, are launched via a first input/output port 342', and one wavelength channel, $\lambda_{nm}$, at a time is redirected by an array of MEMs mirrors 345 to a second input/output port 342'', which is optically coupled to a photodetector PD for measuring the output optical power of the selected wavelength channel as each wavelength channel is selected sequentially. The remaining wavelength channels are redirected to a third input/output port or back to the first input/output port 342', which includes a circulator for separating the incoming signals from the outgoing signals and directing the outgoing signals to a separate output port.

The third set of input/output ports 343 can also be used as an WSS, but with a limited number of input/output ports, e.g. four. If the number of addressable ports in the third set of input/output ports 343 is fewer than half of the number of addressable ports in the first set of input/output ports 341, then the third array of MEMs mirrors 346 can be fabricated in the same process and on the same substrate 350 as the first array 344, but the third array can be processed to tilt with a limited angular range, i.e. only one direction from the horizontal, e.g. one end of each mirror will only have to tilt clockwise between a horizontal position and below horizontal without having to rotate counterclockwise above the horizontal position. Accordingly, the number of electrodes required per mirror can be reduced, e.g. by at least one half, along with the number of electrical connections thereto, since electrodes will not be required under both sides of the mirrors.

Similar to FIG. 8, FIG. 11 illustrates the different output angles provided by the first, second and third arrays of MEMs mirrors 344, 345 and 346, respectively. The mirrors in the first MEMs array 344 have eleven different angular positions corresponding to the eleven different input/output ports in the first array 341 of input/output ports. The mirrors in the second MEMs array 345 have only two different positions for either directing the wavelength channel back to the input port 342' or to the output port 342'' for sequential power monitoring. The mirrors in the third array 346 have four different positions corresponding to the limited number of ports provided in the third array of input/output ports 343.

In use the output ports of one of the arrays of input/output ports may be optically coupled to the input ports of the other arrays of input/output ports to provide cascaded functionality, e.g. one of the signals output the WWS formed by the first array 341 and 344 can be output to the channel monitor formed by the third arrays 343 and 346 and/or the signal output the channel monitor (third arrays 343 and 346) can be then output to an attenuator/WB formed second arrays 342 and 345. Alternatively, all of the channels can be sent to the channel monitor (third arrays 343 and 346) initially and then passed to the WSS (first array 341 and 344) and/or to the attenuator/WB (second arrays 342 and 345).

We claim:

1. A multi-unit wavelength dispersing device comprising:
   a first input port for launching a first multiplexed optical input beam including a plurality of wavelength channels;
   one or more first output ports for outputting one or more of the plurality of wavelength channels from the first optical input beam;
   a first switching lens having a first optical axis for converting a lateral displacement corresponding to a position of the first input port relative to the first optical axis into an angular displacement relative to the first optical axis, and for converting an angular displacement of an outgoing optical beam into a lateral displacement corresponding to a position of a selected one of the one or more first output ports;

a second input port for launching a second multiplexed optical input beam including a plurality of wavelength channels;

one or more second output ports for outputting one or more of the plurality of wavelength channels from the second optical input beam;

a second switching lens having a second optical axis for converting a lateral displacement corresponding to a position of the second input port relative to the second optical axis into an angular displacement relative to the second optical axis, and for converting an angular displacement of an outgoing optical beam into a lateral displacement corresponding to a position of a selected one of the one or more second output ports;

a main lensing element with optical power, having a central axis, for directing and focusing the first and second input optical beams;

a wavelength dispersing element for dispersing the first and second multiplexed optical input beams into constituent wavelength channels;

a first array of wavelength channel redirecting elements for independently directing one or more selected wavelength channels from the plurality of wavelength channels in the first optical input beam to a selected one of the one or more first output ports via the main lensing element and the wavelength dispersing element by providing an angular displacement to the one or more selected wavelength channels for conversion by the first switching lens into a lateral position corresponding to the selected first output port; and a second array of wavelength channel redirecting elements for independently directing one or more selected wavelength channels from the plurality of wavelength channels in the second optical input beam to a selected one of the one or more second output ports via the main lensing element and the wavelength dispersing element by providing an angular displacement to the one or more selected wavelength channels for conversion by the second switching lens into a lateral position corresponding to the selected second output port.

2. The device according to claim 1, wherein the first and second switching lenses are on opposite sides of and equidistant from the central axis.

3. The device according to claim 1, wherein the one or more first output ports comprises at least four output ports; wherein the one or more second output ports comprises at least four output ports; wherein the first array of redirecting elements comprises an array of pivoting MEMs mirrors for directing any combination of selected wavelength channels from the first optical input beam to any one of the first output ports; and wherein the second array of redirecting elements comprises an array of pivoting MEMs mirrors for directing any combination of selected wavelength channels from the second optical input beam to any one of the second output ports.

4. The device according to claim 1, further comprising:

a third input port for launching a third multiplexed optical input beam including a plurality of wavelength channels;

one or more third output ports for outputting one or more of the plurality of wavelength channels from the third optical input beam;

a third switching lens having a third optical axis for converting a lateral displacement corresponding to a position of the third input port relative to the third optical axis into an angular displacement relative to the third optical axis, and for converting an angular displacement of an outgoing optical beam into a lateral displacement corresponding to a position of a selected one of the one or more third output ports; and a third array of wavelength channel redirecting elements for independently directing one or more selected wavelength channels from the plurality of wavelength channels in the third optical input beam to a selected one of the one or more third output ports via the main lensing element and the wavelength dispersing element by providing an angular displacement to the one or more selected wavelength channels for conversion by the third switching lens into a lateral position corresponding to the selected third output port.

5. The device according to claim 4, wherein the optical axis of the third switching lens is aligned with the central axis of the main lensing element, and wherein the first and second switching lenses are on opposite sides of the central axis.

6. The device according to claim 4, further comprising a photodetector optically coupled to one of the first output ports; whereby the first array of redirecting elements sequentially redirects one wavelength channel at a time to the one first output port for optical power measurement by the photodetector, while redirecting remaining wavelength channels to another first output port or back to the first input port.

7. The device according to claim 4, wherein the third output ports comprise at least twice as many ports as the first output ports; wherein each of the first and third arrays of wavelength channel redirecting elements comprise an array of MEMs mirrors; and wherein the first array of wavelength channel redirecting elements only tilt in one direction from horizontal; whereby the first and third array of mirrors can be fabricated in the same process, with the mirrors in the first array of wavelength channel redirecting elements requiring fewer electrodes and electrical connections per mirror than the mirrors in the third array of wavelength channel redirecting elements.

8. The device according to claim 4, wherein the first, second and third arrays of wavelength channel redirecting elements comprise three parallel rows of MEMs mirrors on a same substrate.

9. The device according to claim 4, wherein the third array of wavelength channel redirecting elements comprises an array of liquid crystal cells for attenuating at least a portion of selected wavelength channels.

10. The device according to claim 1, wherein the main lensing element comprises a concave reflective mirror defining a focal plane; wherein the first and second arrays of wavelength channel redirecting elements, and the wavelength dispersing element are disposed in the focal plane.

11. The device according to claim 1, further comprising a photodetector optically coupled to one of the first output ports; whereby the first array of redirecting elements sequentially redirects one wavelength channel at a time to the one first output port for optical power measurement by the photodetector, while redirecting remaining wavelength channels to another first output port or back to the first input port.

12. The device according to claim 11, wherein the other of the first outputs or the first input port is optically coupled to the second input for passing signals after optical power measurement to the second input for providing cascaded functionality.

13. The device according to claim 1, wherein the first and second arrays of wavelength channel redirecting elements comprise two parallel rows of MEMs mirrors on a same substrate.

14. The device according to claim 1, wherein the second array of wavelength channel redirecting elements comprises an array of liquid crystal cells for attenuating at least a portion of selected wavelength channels.

15. The device according to claim 1, wherein one of the first outputs is optically coupled to the second input to provided cascaded functionality.

* * * * *